United States Patent Office 2,798,003
Patented July 2, 1957

2,798,003
WELL CEMENTING COMPOSITION

Bryan E. Morgan and George K. Dumbauld, Houston, Tex., assignors, by mesne assignments, to Esso Research and Engineering Company, Elizabeth, N. J., a corporation of Delaware No Drawing. Application April 25, 1955, Serial No. 503,782

11 Claims. (Cl. 106—90)

The present invention is directed to a cement composition. More particularly, the invention is directed to a cement composition adapted for use in oil wells and particularly a composition which develops a low strength on setting. In its more specific aspects, the invention is directed to a cement composition for use in oil wells and a method of preparing same.

This application is a continuation-in-part of Serial No. 421,432 filed April 6, 1954, entitled "Well Cementing Composition and Method of Using Same" which is a continuation-in-part of Serial No. 267,922 entitled "Well Cementing Composition and Method of Preparing Same" filed January 23, 1952, for Bryan E. Morgan and George Dumbauld, now abandoned.

The present invention may be described briefly as involving a cement composition adapted for use in well cementing operations which comprises a Portland cement, a liquid hydrocarbon, a water soluble organic dispersing agent and a sufficient amount of water to provide a pumpable slurry when the components of the composition are admixed.

The cement used in our composition is Portland cement as described and specified in A. S. T. M. Designation: C-150. Such Portland cements are well known and readily available on the market.

The liquid hydrocarbon employed in our improved composition should have a viscosity below about 40 centipoises at 100° F., because hydrocarbons of high viscosity are generally heavier and are more difficult to emulsify. Preferably, the viscosity of the hydrocarbon should be below about 10 centipoises at 100° F. The liquid hydrocarbon may be a pure hydrocarbon or it may be a mixture of hydrocarbons. The liquid hydrocarbon may be a crude petroleum or it may be a fraction of crude petroleum, such as a gasoline, a kerosene, a gas oil or a diesel oil fraction. It may be desirable to use crude petroleum such as is found in adjacent oil wells in the field where the cementing operation is conducted or under some conditions it may be desirable to use a fuel oil which may be a kerosene or a diesel oil.

The liquid hydrocarbon, as described, may be employed in an amount in the range between about 15 cc. and about 60 cc. per 100 grams of dry cement. A preferred amount is in the range of 20 cc. to 40 cc. per 100 grams of the dry cement.

The water soluble organic dispersing agent may be any water soluble organic dispersing agent selected from a large class of such compounds. The water soluble organic dispersing agent may suitably be selected from the class of compounds possessing calcium tolerance as illustrated by sulfonated compounds, the cation active agents, and the non-ionic agents. As examples of the sulfonated compounds may be mentioned a sulfonated phenol-formaldehyde condensation product, such as disclosed in Serial No. 209,510, filed February 5, 1951, in the name of Richard A. Salathiel, the compounds described by Tucker in U. S. Patent 2,141,569, dated December 27, 1938, and the compounds described by Mark in U. S. Patent 2,141,570, dated December 27, 1938. The compounds of the Tucker patent, supra, are soluble salts of the sulfonic acids, such as aromatic sulfonic acids. Tucker discloses that these compounds are formed by causing an aromatic sulfonic acid to react with formaldehyde or its equivalent in a ratio of two moles of sulfonic acid to each mole of aldehyde. Tucker then forms the water soluble salts of these compounds such as the sodium salts. It is also contemplated that the compounds of Mark, supra, may be used such as exemplified by Mark on page 2 of his specification where he sets out the derivatives of lignin. It is intended that the organic dispersing agent will include all of the compounds mentioned by Mark and Tucker, supra. We also contemplate that our organic dispersing agent will include diethylene glycol monolaurate and polyalkylene ether alcohol. Emulsifying agents are also suitable organic dispersing agents for use in our invention. The emulsifying agents finding use in our invention are the polar, hydrophilic and lipophilic non-ionic compounds and the cationic alkyl substituted quaternary ammonium salts. These polar emulsifying compounds are of the ester, ether-alcohol, ether-ester type. As examples of the emulsifying agents finding use in the invention may be mentioned sorbitan mono-laurate, a condensation product of ethylene oxide, propylene oxide, and propylene glycol, polyoxyethylene lauryl alcohol, polyoxyethyleneoctyl phenol, and the like. Also we may use cetyl triethyl ammonium chloride as well as other alkyl substituted quaternary ammonium salts such as cetyl dimethyl ammonium bromide.

While we have given numerous examples of our organic dispersing agent, it will be clear to the skilled workman that many compounds satisfying the requirement of being calcium tolerant may be used in lieu of the specific materials enumerated above.

The organic dispersing agent of the type illustrated may be used in an amount in the range between 0.1% and 1.0% by weight based on the dry cement. A preferred amount is in the range from 0.2% to 0.6% by weight.

The water should be employed in our improved composition in an amount sufficient to provide a pumpable slurry. An amount in the range between 50% and 100% by weight based on the dry cement will ordinarily be satisfactory with a preferred range from 60% to 80% by weight.

The preparation of our improved composition may be accomplished in several different ways. One method of forming a slurry in accordance with our composition which is adapted for use in well cementing operations is to make an emulsion of the water and the liquid hydrocarbon and thereafter admix with said emulsion a blend of the Portland cement and a water-soluble organic dispersing agent, the proportions of the water, hydrocarbon, and dispersing agent being in the ranges given above.

Another method of forming our improved composition may be employed and this comprises admixing water, a liquid hydrocarbon and a water soluble organic dispersing agent to form an emulsion, the water soluble organic dispersing agent serving as an emulsifying agent. Portland cement is then admixed with the emulsion to form our composition.

The composition of the present invention may also be formed by blending Portland cement with a water soluble organic dispersing agent in an amount in the range between 0.1% and 1.0% by weight based on the dry cement. The Portland cement and the organic dispersing agent are then admixed with water in an amount in the range between 50° and 100° by weight based on the dry cement to form a slurry. Liquid hydrocarbon is then admixed with the slurry in an amount in the range between 15 cc. and 60 cc. per 100 grams of the dry cement.

It is also desirable in some instances to add to our composition a small amount of a colloidal clay. The amount of the colloidal clay should be small since if large amounts are used it may be necessary either to decrease unduly the amount of the liquid hydrocarbon or to increase unduly the amount of the water included in the composition. The colloidal clay ordinarily should be employed in an amount no greater than about 5% by weight based on the dry cement. An amount from about 1% to about 5% by weight based on the dry cement may be used. As examples of suitable colloidal clays are those such as Wyoming bentonite clay, El Paso surface clay, and those clays including the montmorillonites and particularly the sodium montmorillonite. The calcium montmorillonite may be employed and suitable other salts of the montmorillonites may be used. The sodium montmorillonites, such as those encountered in Wyoming bentonite, are included in the preferred type of clay. Clays falling within the purview of our invention are described in the Carman patent, 1,460,788, and the Harth patent, 1,991,637.

When a colloidal clay of the type exemplified above is employed in our composition, the composition may be formed by any of the methods described above in which the clay has been blended with the dry cement prior to forming the slurry or it may be formed in the following manner:

The liquid hydrocarbon or oil component of our composition may be emulsified with water either in the presence or absence of an organic dispersing agent, such as calcium lignin sulfonate. To this emulsion may be added an amount of a colloidal clay not exceeding 5% by weight based on the dry cement to be used in the composition. By adding the colloidal clay to the emulsion, the clay is suitably hydrated and exerts a more beneficial effect than if it is added otherwise. To the emulsion containing the colloidal clay then may be added the Portland cement or the blend of Portland cement and organic dispersing agent in an amount sufficient to provide proportions of the composition as have been indicated above.

In all instances of the various methods which may be used in preparing our composition, it is to be understood that vigorous agitation is to be used to obtain intimate admixture of the composition.

Illustrative of slurries embraced by our invention are slurries such as indicated in the following table:

Table I

| Substance in Slurry | | Slurry 1 | Slurry 2 |
|---|---|---|---|
| Cement | grams | 100 | 100 |
| Calcium Lignosulfonate | do | 0.4 | 0.4 |
| Water | cc | 60 | 70 |
| Oil | cc | 30 | 20 |
| Bentonite | grams | | 4 |

In order to illustrate the invention further a number of stable oil-in-water type cement emulsion slurries were prepared in accordance with our invention such that the slurries possessed suitable fluidity for pumping into boreholes, such as oil wells. The slurries were formed by three different methods. In the first method water and oil were emulsified by violent agitation, calcium lignosulfonate was added as an organic dispersing agent to dry cement and the resulting mixture was added to the emulsion with stirring. In the second method calcium lignosulfonate as an organic dispersing agent was mixed with dry cement, the mixture was added to water with stirring, and oil was added to the slurry formed thereby. In the third method an emulsion of water, oil and calcium lignisulfonate was prepared and dry cement added thereto.

The proportions of the ingredients of the several cement slurries, the method of forming the slurries and the inspections and observations of the physical characteristics of the slurries are given in Table II, which illustrates the effect of varying composition and mixing procedures on the properties of the emulsion cement slurries.

Table II
EFFECT OF LIQUID CONTENT WITH WATER-TO-OIL RATIO OF 2:1

| Composition of Emulsion Cement Slurry | | | | Method of Mixing [2] | Fluidity—R. P. M. at 400 grams Stormer | Observations on Setting [3] | Remarks |
|---|---|---|---|---|---|---|---|
| Portland Cement, grams | Calcium Lignosulfonate, grams | Water, cc. | Oil,[1] cc. | | | | |
| 100 | 1.0 | 60 | 30 | A | 840 | Set | No oil separated. |
| 100 | 1.0 | 70 | 35 | A | 1,090 | Set | Do. |

EFFECT OF OIL CONTENT AT CONSTANT WATER-TO-CEMENT RATIO

| 100 | 1.0 | 70 | 26 | A | 1,250 | Set | No oil separated. |
|---|---|---|---|---|---|---|---|
| 100 | 1.0 | 70 | 35 | A | 1,090 | Set | Do. |
| 100 | 1.0 | 70 | 42 | A | 800 | Set | Do. |

EFFECT OF MIXING PROCEDURE AT CONSTANT WATER-TO AND OIL-TO-CEMENT RATIO

| 100 | 1.0 | 60 | 30 | A | 840 | Set | No oil separated. |
|---|---|---|---|---|---|---|---|
| 100 | 1.0 | 60 | 30 | B | 830 | Set | Do. |
| 100 | 1.0 | 70 | 35 | A | 1,090 | Set | Do. |
| 100 | 1.0 | 70 | 35 | B | 1,220 | Set | Do. |
| 100 | 1.0 | 70 | 42 | A | 800 | Set | Do. |
| 100 | 1.0 | 70 | 42 | B | 480 | Set | Do. |
| 100 | 1.0 | 70 | 42 | C | 1,000 | Set | Do. |

[1] Kerosene, specific gravity of 0.80, viscosity of 1.6 centipoises.
[2] A—Emulsion of water and oil prepared by violent agitation. Calcium lignosulfonate mixed with dry cement and resulting mixture placed in emulsion with stirring. B—Calcium lignosulfonate mixed with dry cement and resulting mixture placed in water with stirring. Oil added to above slurry. C—Emulsion of water, oil, and calcium lignosulfonate prepared and dry cement added.
[3] Specimens cured under water 175° F.

It will be noted from the data shown in Table II that in all instances the cement slurries possessed fluidities suitable for pumping and they set without any separation of oil.

Additional slurries were then made up to illustrate the effect of change in oil content and the addition of bentonite on the physical properties of the slurry and of the set cement. These data area presented in Table III which sets out the fluidity, the filtration, thickening time, and strength properties of satisfactory cement compositions prepared in accordance with our invention.

Table III

| Composition of Emulsion Cement Slurry | | | | | Fluidity—R.P.M. at 400-grams Stormer | Filtration [1]—Water Loss at 100 lbs./sq. in., cc. | | Thickening Time [2] | | Tensile Strength: lbs./sq. in.—Cured Under Water at 120° F. | |
|---|---|---|---|---|---|---|---|---|---|---|---|
| Portland Cement, grams | Bentonite, grams | Calcium Lignosulfonate, grams | Water, cc. | Oil [3] cc. | | 3 min. | 30 min. | Hrs. | Mins. | 1 day | 15 days |
| 100 | 0 | 0.4 | 60 | 0 | 1,430 | | | | | | |
| 100 | 0 | 0.4 | 60 | 20 | 700 | | | | | 103 | 250 |
| 100 | 0 | 0.4 | 60 | 30 | 550 | 53 | 152 | | | | |
| 100 | 4 | 0.4 | 70 | 0 | 1,430 | | | | | | |
| 100 | 4 | 0.4 | 70 | 20 | 780 | 29 | 102 | | | 113 | 240 |
| 100 | 4 | 0.4 | 70 | 30 | 100 | | | | | | |
| 100 [4] | 0 | 0.4 | 60 | 30 | 670 | 35 | 112 | 1 | 45 | 113 | 197 |
| 100 [4] | 4 | 0.4 | 70 | 20 | 970 | 27 | 96 | 2 | 10 | | |

[1] Tested in Standard A. P. I. low-pressure wall building mud tester.
[2] Tested in accordance with Schedule 8, well-simulation casing-cement job for 14,000 ft. depth, A. P. I. Code 32 (Tentative), Second Edition, June, 1950.
[3] Kerosene, specific gravity of 0.80, viscosity of 1.6 centipoises.
[4] Another brand of Portland cement used for these tests.

It will be noted from the data in Table III that an increase in the oil content decreases the fluidity of the slurry. The use of a small amount of bentonite reduces the filtration rate and increases slightly the thickening time of the cement slurry without affecting appreciably the tensile strength of the set cement. It will be noted that sufficient tensile strength was developed both with and without bentonite in the slurry to give a cement of satisfactory strength for oil well cementing operations.

In order to illustrate the superiority of our improved cementing composition over ordinary cement slurries from a standpoint of water loss, additional compositions were prepared and tested, the results of which are presented in Table IV where the effects of the composition and method of oil addition on the properties of the cement emulsion slurries are given.

the presence of oil in the filtrate from the slurry. This applies equally to the slurries prepared by adding the cement to the emulsion of oil and water containing the calcium lignosulfonate. Where the calcium lignosulfonate is admixed with the solids, cement and bentonite, and water followed by oil added to the mixture, the amount of lignosulfonate required to prevent the presence of oil in the filtrate was about 0.2% by weight based on the dry cement.

It should be noted from the data in this table that the filtration rate of a conventional cement slurry now used in oil well cementing operations is 80 cc. in one minute, whereas the filtration rates of slurries of our improved composition range from 16 cc. to 96 cc. in 10 minutes.

Additional slurries were prepared to show the effect of the organic dispersing agent, such as calcium ligno- Table IV

REFERENCE (ORDINARY NEAT CEMENT SLURRY)

| Composition of Emulsion Cement Slurry | | | | | Method of Mixing [3] | Fluidity—R.P.M. at 400-grams Stormer | Filtration [1]—Water Loss in 100 lbs./sq. in. | | | Remarks |
|---|---|---|---|---|---|---|---|---|---|---|
| Portland Cement, grams | Bentonite, grams | Calcium Lignosulfonate, grams | Water, cc. | Oil, [2] cc. | | | 3 min. | 10 min. | 30 min. | |
| 100 | 0 | 0.0 | 46 | 0 | A | 700 | see remarks | | | 80 cc. in 1 min. |

EFFECT OF BENTONITE, CALCIUM LIGNOSULFONATE AND OIL

| 100 | 0 | 0.4 | 70 | 20 | A | 1,500 | 51 | 97 | | No oil in filtrate. |
| 100 | 4 | 0.0 | 70 | 20 | A | 460 | 58 | | | 8 cc. oil in 115 cc. filtrate. |
| 100 | 4 | 0.4 | 70 | 0 | A | 1,500 | 93 | | | |
| 100 | 4 | 0.4 | 70 | 20 | A | 1,000 | 29 | 57 | 103 | No oil in filtrate. |

EFFECT OF CONCENTRATION OF CALCIUM LIGNOSULFONATE

| 100 | 4 | 0.0 | 70 | 20 | A | 460 | 58 | | | 8 cc. oil in 115 cc. filtrate. |
| 100 | 4 | 0.1 | 70 | 20 | A | 880 | 50 | 96 | | 1 cc. oil in 119 cc. filtrate. |
| 100 | 4 | 0.2 | 70 | 20 | A | 920 | 36 | 70 | 128 | No oil in filtrate. |
| 100 | 4 | 0.4 | 70 | 20 | A | 1,000 | 29 | 57 | 103 | Do. |
| 100 | 4 | 0.6 | 70 | 20 | A | 1,250 | 21 | 42 | 74 | Do. |
| 100 | 4 | 1.0 | 70 | 20 | A | 1,300 | 12 | 25 | 46 | Do. |

EFFECT OF METHOD OF ADDITION

| 100 | 4 | 0.0 | 70 | 20 | A | 460 | 58 | | | 8 cc. oil in 115 cc. filtrate. |
| 100 | 4 | 0.0 | 70 | 20 | B | 880 | 92 | | | 8 cc. oil in 137 cc. filtrate. |
| 100 | 4 | 0.1 | 70 | 20 | A | 880 | 50 | 96 | | 1 cc. oil in 119 cc. filtrate. |
| 100 | 4 | 0.1 | 70 | 20 | B | 700 | 43 | 86 | | No oil in filtrate. |
| 100 | 4 | 0.6 | 70 | 20 | A | 1,250 | 21 | 42 | 74 | Do. |
| 100 | 4 | 0.6 | 70 | 20 | C | 550 | 8 | 16 | 31 | Do. |

[1] Tested in Standard A. P. I. low-pressure wall-building mud tester.
[2] Kerosene, specific gravity of 0.80, viscosity of 1.6 centipoises.
[3] A—Bentonite and calcium lignosulfonate mixed with dry cement prior to addition to mix water. Oil added to above slurry. B—Emulsion of water, oil, and calcium lignosulfonate prepared. Bentonite mixed with dry cement and resulting mixture added to the above emulsion. C—Emulsion of water, oil, bentonite, and calcium lignosulfonate prepared. Dry cement then added to this emulsion.

It will be noted from the data in Table IV that the calcium lignosulfonate should be present in at least 0.1% by weight based on the dry cement in order to prevent sulfonate concentration, on the thickening time of slurry and the tensile strength of the set cement at different temperatures. These data are presented in Table V.

Table V

| Composition of Emulsion Cement Slurry | | | | | Thickening Time [1] | | | Tensile Strength: lbs./sq. in. | | | |
|---|---|---|---|---|---|---|---|---|---|---|---|
| Portland Cement, grams | Bentonite, grams | Calcium Lignosulfonate, grams | Water, cc. | Oil,[2] cc. | | | | Cured Under Water at 120° F. | | Cured Under Water at 180° F. | |
| | | | | | Schedule No. | Hours | Minutes | 1 day | 7 days | 1 day | 7 days |
| 100 | 0 | 0 | 46 | 0 | | | | 362 | 527 | | |
| 100 | 4 | 0.4 | 70 | 20 | 6 | 1 | 50 | | | | |
| 100 | 4 | 0.4 | 70 | 20 | 7 | 1 | 50 | | | | |
| 100 | 4 | 0.4 | 70 | 20 | 8 | 1 | 45 | | | | |
| 100 | 4 | 0.4 | 70 | 20 | 9 | 1 | 30 | | | | |
| 100 | 4 | 0.2 | 70 | 20 | 8 | 1 | 10 | | | | |
| 100 | 4 | 0.4 | 70 | 20 | 8 | 1 | 45 | 108 | 220 | | |
| 100 | 4 | 0.6 | 70 | 20 | 8 | 4 | 30 | 40 | 200 | 143 | |
| 100 | 4 | 0.6 | 70 | 20 | 9 | 2 | 00 | | | | |
| 100 | 4 | 0.8 | 70 | 20 | 9 | 2 | 20 | | | 112 | 170 |
| 100 | 4 | 1.0 | 70 | 20 | | | | | | 110 | 175 |

[1] Tested in accordance with well simulation casing cementing jobs as per A. P. I. Code 32 (Tentative), Second Edition, June 1950:

| Schedule No. | Test Depth, ft. | Maximum Temp., ° F. | Maximum Press., lbs./sq. in. |
|---|---|---|---|
| 6 | 10,000 | 144 | 7,484 |
| 7 | 12,000 | 172 | 10,227 |
| 8 | 14,000 | 206 | 13,386 |
| 9 | 16,000 | 248 | 16,144 |

[2] Kerosene, specific gravity of 0.80, viscosity of 1.6 centipoises.

From these data it may be seen that since the thickening time decreases with increasing temperature and since the addition of calcium lignosulfonate increases the thickening time, the thickening time of the cement slurry may be controlled readily by varying the amount of calcium lignosulfonate used. For low temperature wells, low concentrations in the range from 0.1% to 0.2% calcium lignosulfonate should be sufficient, whereas in deep wells with higher bottom-hole temperatures it may be desirable to raise the concentration of lignosulfonate to 0.6% or as high as 1% by weight based on the dry cement. The rate of strength development of cements increases with increasing temperature and although, as the data show, the calcium lignosulfonate decreases the rate of strength development of our cement compositions, sufficient early strengths are developed by the improved composition containing the larger amounts of the calcium lignosulfonate in the range given to regulate the thickening time at the higher temperatures. It will be noted from the data that the ultimate tensile strength of the slurries having compositions as shown in Table IV is about 200 lbs. per sq. in., which is quite desirable for well cementing purposes. Tensile strengths of 50 to 100 lbs. per sq. in. are considered entirely adequate in this use.

To illustrate further the amount of liquid hydrocarbon to be used in our composition, the data in Table V are presented to illustrate a number of cement compositions which are made up to give cement compositions having from 10 cc. to 75 cc. of oil per 100 grams of cement, the amount of water in the composition being adjusted to maintain the fluidity of the slurries at approximately constant value. These slurries were made up by blending the calcium lignosulfonate with the dry cement, adding this mixture to the water with stirring and then adding the oil with stirring. The composition of these slurries, their fluidities, and the tensile strength after curing under water are given in Table VI.

Table VI

| Composition of Emulsion Cement Slurry | | | | Fluidity— R. P. M. at 400-grams Stormer | Tensile Strength, lbs./sq. in. (Cured under Water at 120° F.) | |
|---|---|---|---|---|---|---|
| Portland Cement, grams | Oil,[1] cc. | Water, cc. | Calcium Lignosulfonate, grams | | 1 day | 14 days |
| 100 | 0 | 46 | 0.0 | 940 | 421 | 530 |
| 100 | 10 | 50 | 0.4 | 940 | 205 | 347 |
| 100 | 20 | 60 | 0.4 | 910 | 163 | 268 |
| 100 | 30 | 70 | 0.4 | 910 | 92 | 172 |
| 100 | 40 | 80 | 0.4 | 940 | 57 | 127 |
| 100 | 50 | 90 | 0.4 | 940 | 35 | 85 |
| 100 | 60 | 100 | 0.4 | 1,000 | 25 | [2] 68 |
| 100 | 75 | 110 | 0.4 | 940 | 25 | [2] 47 |

[1] Diesel oil, specific gravity of 0.835, viscosity of 3.0 centipoises.
[2] 7-day results.

Referring to the data in Table VI, the 14-day strength of the set cement represents, for all practical purposes, the ultimate and final strength of the composition. While as little as 10 cc. of oil per 100 grams of cement caused a definite reduction in strength of the cement composition, it is to be noted that an amount above 10 cc. per 100 grams of cement is required to provide a composition having an ultimate strength less than 300 lbs. per sq. in. Thus it will be seen that a composition having an oil content of approximately 15 cc. per 100 grams of cement will attain an ultimate strength near 300 lbs. per sq. in. Oliphant and Farris, AIME Transactions, vol. 170 (1947), page 225 have set out the advantages of low strength cement having tensile strength below 300 lbs. per sq. in. for use in oil well cementing operations.

The data given in the foregoing examples illustrate that our composition should contain between 15 cc. and 60 cc. of liquid hydrocarbon per 100 grams of cement, between 50 cc. and 100 cc. of water per 100 grams of cement, and an organic dispersing agent in the range between 0.1 gram and 1.0 gram per 100 grams of cement to give a cement composition when set having a tensile strength of 300 lbs. per sq. in. or less. Actually, it is preferred to use liquid hydrocarbon in an amount in the range between 20 cc. and 40 cc. per 100 grams of cement, water in an amount in the range from 60 cc. and 80 cc. per 100 grams of cement, and an organic dispersing agent in the range between 0.2 gram and 0.6 gram per 100 grams of cement.

In order to illustrate the effectiveness of other water soluble organic dispersing agents such as the product described in Serial No. 209,510, supra, slurries were made up with the sodium salt of sulfonated phenol formaldehyde condensation product in compositions in accordance with the present invention. The compositions of these slurries and the results of the tests thereon are presented in Table VII.

The data in Table VII show that the sodium salt of sulfonated phenol formaldehyde product is effective as an organic dispersing agent and compositions are produced having the desirable properties sought for.

In order to show that slurries containing crude oil in accordance with our invention may be produced having the desirable properties, slurries were made up in which crude oil was used in one instance as compared to kerosene in another instance. Both slurries contained bentonite, calcium lignosulfonate and water, in addition to the kerosene in one instance and the crude oil in another instance. The properties of these slurries are shown in Table VIII, where the results are compared.

Table VIII

| Composition of Emulsion Cement Slurry | | | | | Fluidity— R. P. M. at 400 grams Stormer | Thickening [1] Time | |
|---|---|---|---|---|---|---|---|
| Portland Cement, grams | Calcium Ligno- sulfonate, grams | Bentonite, grams | Water, cc. | Oil, cc. | | Hrs. | Mins. |
| 100 | 0.4 | 4 | 70 | [2] 20 | 1,320 | 2 | 00 |
| 100 | 0.4 | 4 | 70 | [3] 20 | 1,200 | 2 | 00 |

[1] Tested in accordance with Schedule 6, well-simulation casing-cementing job for 10,000 ft. depth, A.P.I. Code 32 (Tentative), Second Edition, June 1950.
[2] Kerosene specific gravity of 0.80, viscosity of 1.6 centipoises.
[3] Crude oil, specific gravity of 0.85, viscosity of 5.0 centipoises.

It will be noted from the data in Table VIII that the emulsion cement slurry prepared with crude oil is very similar in properties to that prepared from kerosene. These two slurries were prepared by emulsifying the oil, water and calcium lignin sulfonate together and then

Table VII

| Composition of Emulsion Cement Slurry | | | | | Fluidity— R. P. M. at 400 grams Stormer | Filtration [2]— Water Loss at 100 lbs./sq. in., cc. | | Thickening [3] Time | | Tensile Strength, lbs./sq. in.—Cured Under Water at 180° F. | |
|---|---|---|---|---|---|---|---|---|---|---|---|
| Portland Cement, grams | Sodium Salt of Sulfonated Phenol Formalde- hyde, grams | Benton- ite, grams | Water, cc. | Oil, [1] cc. | | 3 min. | 30 min. | Hrs. | Min. | 1 day | 28 days |
| 100 | 0.15 | 0 | 60 | 30 | 830 | | | | | 152 | 175 |
| 100 | 0.50 | 0 | 60 | 30 | 1,200 | | | 1 | 50 | | |
| 100 | 0.50 | 4 | 70 | 20 | 770 | 39 | [4] 113 | | | 147 | |

[1] Kerosene, 0.8 Specific gravity.
[2] Tested in Standard A.P.I. low-pressure wall building mud tester.
[3] Tested in accordance with Schedule 8, well-simulation casing-cementing job for 14,000 ft. depth, A.P.I. Code 32 (Tentative), Second Edition, June 1950.
[4] Filtrate contained 3 cc. of oil.

As indicated by the results in Table VII, the sodium salt of sulfonated phenol formaldehyde condensation product is effective in preparation of oil emulsion cements of our invention. In preparing the slurries the tests of which are presented in Table VII, the sodium salt of the sulfonated phenol formaldehyde product was mixed with the dry cement and water was added to the mixture while stirring. Oil was then added with continued stirring to produce the final slurry. In the instance where bentonite was used the bentonite was mixed with the sodium salt of the sulfonated phenol formaldehyde condensation product and the dry cement.

adding the dry mixture of bentonite and cement to the emulsion with stirring.

In order to show the effectiveness of the emulsifying agents of the type illustrated in cement compositions, cement slurries made up of Lone Star Portland cement, water, kerosene and emulsifying agent, were formed and the filtration rates as illustrated by the API filtration test were determined. Table IX which follows gives the commercial name of the emulsifying agent, the chemical composition, the chemical type, the filtration rate after 1, 2, 3, and 7½ minutes, the description of the filtrate and remarks as to the characteristics of the slurry.

Table IX.—Molecular emulsifying agents for use in oil-emulsion cements [1]

| Commercial Name of Emulsifying Agent | Chemical Composition | Chemical Type | Filtration—A.P.I. Fluid Loss (cc.) [2] | | | | Description of Filtrate | Remarks |
|---|---|---|---|---|---|---|---|---|
| | | | 1 min. | 2 min. | 3 min. | 7½ min. | | |
| (1) Span 20 | Sorbitan Mono-Laurate | Ester | 1.5 | 2.5 | 3.5 | 6.5 | 2 cc. emulsion on water filtrate. | Cement was oil-wet; set in 24 hours, but crumbly. |
| (2) Pluronic L44 | Condensation product of Ethylene Oxide, Propylene Oxide and Propylene Glycol. | Ether-Alcohol | 7 | 9 | 10 | 15 | Creamy emulsion. | Slurry very fluid; set in 24 hours. |
| (3) Pluronic F68 | ...do... | ...do... | 7 | 9.5 | 11 | 16.5 | Cloudy emulsion. | Do. |
| (4) BRIJ #35 | Polyoxyethylene Lauryl Alcohol. | ...do... | 9 | 12 | 13 | 18 | Creamy emulsion. | Do. |
| (5) Renex 30 | A Polyoxyethylene Alcohol | ...do... | 13 | 16.5 | 18.5 | 24 | ...do... | Do. |
| (6) Triton X-100 | Polyoxyethylene Octyl Phenol. | ...do... | 13 | 17 | 19 | 24.5 | ...do... | Do. |
| (7) Igepal CA-Extra High Concentrate. | A Polyether-alcohol condensation product. | ...do... | 15 | 18 | 20 | 25 | ...do... | Do. |
| (8) Tween 20 | Polyoxyethylene Sorbitan Mono-Laurate. | Ether-Ester | 11 | 14.5 | 17 | 25 | ...do... | Slurry very fluid; set in 72 hours. |
| (9) Tween 60 | Polyoxyethylene Sorbitan Mono-Stearate. | ...do... | 12 | 15 | 18 | 25 | ...do... | Do. |
| (10) Tergitol NPX | A Polyoxyethylene Alcohol. | Ether-Alcohol | 13 | 17 | 19 | | ...do... | Slurry very fluid; set in 24 hours. |
| (11) Igepal Co-630 | Alkyl Phenoxy Polyoxyethylene Ethanol. | ...do... | 17 | 21 | 23 | 30 | ...do... | Do. |
| (12) Emulphor ELA | Condensation product of Ethylene Oxides & Fatty Acids. | Ether-Ester | 12 | 16.5 | 20 | 31 | ...do... | Do. |
| (13) Pluronic L-62 | Condensation product of Ethylene Oxide, Propylene Oxide and Propylene Glycol. | Ether-Alcohol | 37 | 57 | 71 | | ...do... | Do. |
| (14) Span 85 | Sorbitan Tri-Oleate | Ester | 42 | 60 | 74 | | Cloudy emulsion. | No set test. |

[1] Cement composition: 100 grams Lone Star Normal Portland Cement; 90 cc. water; 30 cc. kerosene; 0.6 gram emulsifying agent.
[2] Oil emulsion cement slurry without emulsifying agent: fluid loss 130 cc. after 3 minutes.

It will be seen from these data that compounds of the ester, ether-alcohol, ether-ester type were employed with success. Best results, as far as filtration rate is concerned, were obtained with the sorbitan mono-laurate which is an ester-type emulsifying agent. It will be noted that the original filtration fluid loss of the oil-emulsion cement slurry without the emulsifying agent was 130 cc. after 3 minutes which indicates a remarkable reduction for the emulsifying agents of the present invention.

Additional slurries were made up with cation emulsifying agents using the same cement slurry as used to obtain the data reported in Table IX with the only difference being that alkyl substituted ammonium salts were employed. In Table X, which follows, the same type of data are presented for the slurries containing these latter emulsifying agents as were presented in Table IX.

presence of bentonitic clays and the compositions containing the emulsifying agent exhibit a tendency to foam. Foaming may suitably be controlled by employment of suitable defoaming agents, such as the silicones; high molecular weight monohydric and polyhydric alcohols, such as octanol, polypropylene glycol and the organophosphates, such as tributyl phosphate, may be used. Also in controlling the tendency toward foaming, this tendency may be reduced or eliminated by avoiding the entrainment of air during the mixing operation in which the composition is formed.

The emulsifying agents employed in the present invention, as stated before, may be the polar, non-ionic compounds of high formula weight of hydrophilic and lipophilic nature. The compounds of greater hydrophilic and lipophylic nature appear to be more efficient in our Table X.—Cationic emulsifying agent for use in oil-emulsion cements

| Commercial Name of Emulsifying Agent | Chemical Composition | Chemical Type | Filtration—A.P.I. Fluid Loss (cc.) [2] | | | | Description of Filtrate | Remarks |
|---|---|---|---|---|---|---|---|---|
| | | | 1 min. | 2 min. | 3 min. | 7½ min. | | |
| (1) Eastman T-5661 | Cetyl Dimethyl Ethyl Ammonium Bromide. | Quaternary Ammonium Salt. | 2 | 3 | 4 | 6.5 | Cloudy emulsion | Slurry very fluid; set in 24 hours. |
| (2) Eastman T-5650 | Cetyl Trimethyl Ammonium Bromide. | ...do... | 4 | 5.5 | 7.5 | 12 | ...do... | Do. |
| (3) Aquarad S | Soy Trimethyl Ammonium Chloride. | ...do... | 12 | 17 | 21 | 31 | Creamy emulsion. | Do. |
| (4) Hyamine 1622 | Para Di-isobutyl Phenoxy Ethoxy Ethyl Dimethyl Benzyl Ammonium Chloride Monohydrate. | ...do... | 37 | 55 | 64 | | ...do... | Do. |

[2] Oil-Emulsion Cement Slurry without emulsifying agent: fluid loss 130 cc. after 3 minutes.

It will be seen from the data in Table X that the emulsifying agents from the type of the quaternary ammonium salts give improved results with best results being obtained with cetyl dimethyl ethyl and cetyl tri-methyl ammonium bromide.

In all of the results presented in Tables IX and X, it will be clear that a fluid cement was obtained which set within 24 to 72 hours.

In employing the emulsifying agents of the present invention, a word of caution appears to be in order. For example, the emulsifying agents are not effective in the composition and method then those of lesser strength with respect to these characteristics.

It will be seen that our improved composition has numerous advantages over conventional cement. Our improved composition has low density, low tensile strength, improved settling characteristics, low water losses and also by virtue of the oil content has lubricating properties. The density of our emulsion slurries, exemplified by the numerous examples, ranges from about 11 to approximately 12½ lbs. per gallon as compared to 16 for neat cement slurries. The low density of our emulsion slurries is important since the density of the conventional neat Portland cement slurry is higher than desirable for many cementing operations. Furthermore, the neat slurry of the prior art does not possess sufficient gel strength to suspend all the cement particles and settling may occur before the mass sets. The neat slurry of the prior art has a very high filtration and the set mass possesses greater strength than desirable. In our compositions the density of the slurries is sufficient to allow the slurry to be used in well cementing operations more efficiently. Furthermore, we are able to produce low density slurries having a sufficiently high tensile strength to be suitable for oil well cementing operations. It will be apparent to the skilled workman that we may vary the strength of our cement by suitably adjusting the concentration of oil in the slurry. The tensile strength of the set cements from our composition is about 200 and lower than 200 lbs. per sq. in. as compared to 600 lbs. or higher for neat cement, which makes our composition quite desirable for oil well cementing operations. Oliphant and Farris, supra, pointed out the advantages of such low strength cements. In the prior art cements, such as neat cement slurries, the solid particles settle appreciably and this settling may result in a faulty cement job. On the other hand, cement slurries, such as ours, show no tendency for the solids to settle on standing. As illustrated by the data, our compositions are outstanding from the standpoint of low water loss. Cement slurries in accordance with the present invention show filtration rates of approximately 100 cc. in 30 minutes as compared to approximately 80 cc. in one minute for the prior art compositions when the two types of slurries are tested at 100 lbs. per sq. in. in the standard API low-pressure wall-building mud tester. As pointed out before, our composition has lubricating properties. It is believed that the use of emulsion cements will lubricate the well casing and permit it to be rotated readily during placement of cement.

The compositions of the present invention achieve a beneficial result only by the presence of the several components therein. The presence of the liquid hydrocarbon or oil results in the cement composition having a low density, a low filtration rate, and a low strength. The organic dispersing agent, such as calcium lignosulfonate, prevents separation of oil from the slurry and increases the thickening time. The water and the cement are used in proportions to provide a slurry of the desirable fluidity and a set mass of the desired strength. Thus each of the components of our composition cooperates to produce a desired result.

The nature and objects of the present invention having been completely described and illustrated, what we wish to claim as new and useful and to secure by Letters Patent is:

1. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, cetyl dimethyl ethyl ammonium bromide in an amount in the range between 0.1% and 1.0% by weight based on the dry cement, and water in an amount in the range between 50% and 100% by weight based on the dry cement.

2. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, an emulsifying agent selected from the class consisting of the calcium tolerant cation alkyl substituted quaternary ammonium halides in an amount in the range between 0.1% and 1.0% by weight based on the dry cement, and water in an amount in the range between 50% and 100% by weight based on the dry cement sufficient to provide a pumpable slurry.

3. A cement composition adapted for use in well cementing operations having a density in the range from about 11 to approximately 12½ lbs. per gallon and having a tensile strength when set below 300 lbs. per sq. in. which consists of a Portland cement, a liquid hydrocarbon selected from the class consisting of pure hydrocarbons and hydrocarbon mixtures having a viscosity at 100° F. less than 40 centipoises in an amount in the range between 15 cc. and 60 cc. per 100 grams of the dry cement, cetyl trimethyl ammonium bromide in an amount in the range between 0.1% and 1.0% by weight based on the dry cement and water in an amount in the range between 50% and 100% by weight based on the dry cement 4. A composition in accordance with claim 2 in which the emulsifying agent is cetyl dimethyl ammonium bromide.

5. A composition in accordance with claim 2 in which the emulsifying agent is soy trimethyl ammonium chloride.

6. A composition in accordance with claim 2 in which the emulsifying agent is para diisobutyl phenoxy ethoxy ethyl dimethyl benzyl ammonium chloride monohydrate.

7. A composition in accordance with claim 2 in which the hydrocarbon is kerosene.

8. A composition in accordance with claim 2 in which the hydrocarbon is crude petroleum.

9. A composition in accordance with claim 2 in which the hydrocarbon is diesel oil.

10. A composition in accordance with claim 2 in which the hydrocarbon is gasoline.

11. A composition in accordance with claim 2 in which the hydrocarbon is fuel oil.

References Cited in the file of this patent

UNITED STATES PATENTS

| 1,109,120 | Ellis | Sept. 1, 1914 |
| 1,599,903 | Lord | Sept. 14, 1926 |
| 2,054,257 | Hueter | Sept. 15, 1936 |
| 2,285,302 | Paterson | June 2, 1942 |
| 2,582,459 | Salathiel | Jan. 15, 1952 |
| 2,644,771 | Kempthorne | July 7, 1953 |